March 23, 1965
H. OETIKER
3,174,774
SAFETY CONNECTION FOR HOSES
Filed June 30, 1959
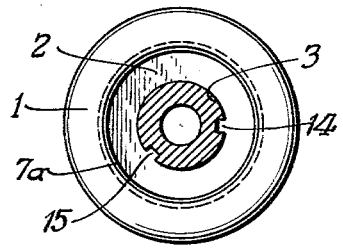
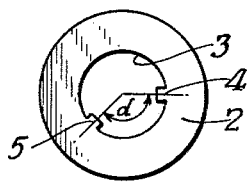
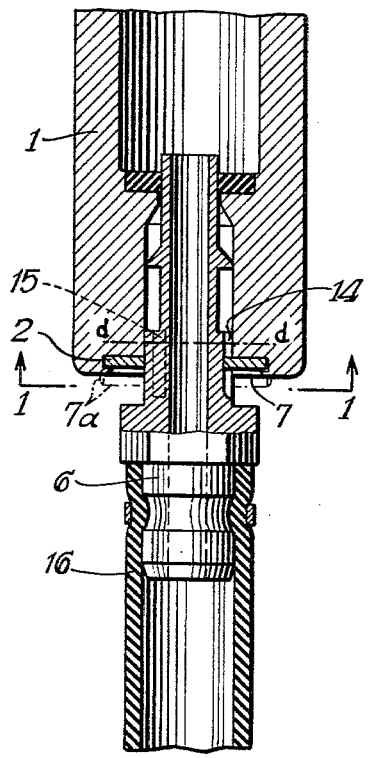
INVENTOR
HANS OETIKER.
BY
K. H. Mayr
ATTORNEY

3,174,774
SAFETY CONNECTION FOR HOSES
Hans Oetiker, 21 Oberdorfstrasse, Horgen, Switzerland
Filed June 30, 1959, Ser. No. 824,033
8 Claims. (Cl. 285—18)

The present invention relates to hose connections of the type including a coupling member and a nipple received therein, the nipple being provided with grooves and the coupling member being provided with protuberances cooperating with the grooves so that a nipple can be inserted only in such coupling members whose protuberances correspond to the grooves in the nipple.

This is of great importance, for example, when connecting hoses to a welding torch to which oxygen and hydrogen are supplied through different hoses. In this case it is absolutely essential that connection of the hose conducting one gas to a hose conducting the other gas is definitely prevented to eliminate the danger of an explosion. It is conventional to provide a bore of the coupling members with protuberances which fit into corresponding grooves of a nipple. The protuberances extending into the bore of a coupling member are set at a certain angle so that only a nipple can be inserted whose grooves are set at the same angle.

If such hose connections are disconnected by a person who is not familiar with this type of connection, it happens that he tries to turn the coupling member relative to the nipple. If this is done by force, which is very likely because the two mating parts of the connection are often provided with hexagonal surfaces which are intended for different purposes, the protuberances may be shared off so that the coupling member can be connected to a wrong nipple.

It is the object of the present invention to provide a hose connection which cannot be ruined by mishandling. In the connection according to the invention a circular disc member is rotatably inserted in the coupling member. The disc member has an aperture having a peripheral portion set at an angle. The portion of the nipple inserted in the coupling member and extending through the aperture in the disc member has a cross section corresponding to that of the nipple so that only selected nipples can be inserted into corresponding coupling members. Relative rotation of the nipple and of the coupling member cannot destroy the disc member because the latter can rotate in the coupling member.

The novel features which are considered characteristic of the invention are set forth with particularity in the appended claims. The invention itself, however, and additional objects and advantages thereof will best be understood from the following description of an embodiment thereof when read in connection with the accompanying drawing, in which:

FIG. 1 is a front view of a coupling member according to the invention with a nipple, shown in cross section, inserted thereinto.

FIG. 2 is a plan view of a safety element forming part of the coupling member shown in FIG. 1.

FIG. 3 is a longitudinal sectional view of an assembled hose connection according to the invention.

Like parts are designated by like numerals in the different figures of the drawing.

Referring more particularly to the drawing, numeral 1 designates a coupling member having a bore or cavity adapted to receive a nipple 6. The member 1 is secured to the end of a hose, not shown, or may be part of a device to which a hose must be connected. The nipple 6 is secured to the end of a hose 16. A circular disc member 2 is coaxially rotatably inserted in the coupling member. The member 2 has an aperture 3 whose configuration corresponds to the cross sectional configuration of the nipple at the location $d$–$d$ shown in FIG. 3. In the illustrated example, the disc member 2 is annular, protuberances 4 and 5 extending radially into the aperture 3. The configuration and angular placement $\alpha$ of the protuberances corresponds to the cross section and angular placement of grooves or recesses 14, 15 in the outside of the nipple 6 whose diameter is slightly smaller than the diameter of the bore 3 of the member 2. The angle $\alpha$ is different in different hose connections, for example, in a connection used for hoses conducting hydrogen the angle $\alpha$ is different from that of a connection for hoses conducting oxygen to avoid confusion.

The end of the coupling member 1 facing the nipple 6 is provided with an annular recess 7 adapted to receive the member 2. When shaping the end face of the coupling member an annular rim or bead 7a is provided which is bent or pressed upon the member 2 after insertion of the latter in the recess 7. The pressure of the rim or bead on the annular member 2 is not enough to prevent rotation of the member 2 by a force which is smaller than that which would be needed for shearing off the protuberances 4 and 5.

The safety element 2 is preferably made by stamping. In this way an accurate shape is obtained at low cost. Sharp edges at the circumference of the member 2 are preferably rounded to facilitate rotation of the member 2 in the element 1 after the bead 7a has been pressed onto the member 2. The stamped member 2 is preferably hardened to avoid deformation of the member when the bead 7a is bent upon it and to facilitate rotation in the element 1.

If it is desired that the nipple 6 is easily rotatable in the coupling element 1, the pressure applied to the bead 7a is so much reduced that the member 2 is easily rotatable in the element 1. In this case adequate bearing surfaces should be provided to avoid erosion.

If desired, more than two protuberances may be provided on the annular member 2 and more than two corresponding grooves may be provided on the nipple 6. The protuberances and grooves may be set at a great variety of angles so that almost any number of hose connections whose parts are not interchangeable, can be obtained.

In lieu of the circular aperture 3 with protuberances 4, 5 protruding thereinto and in lieu of the grooves 14, 15 in a cylindrical portion of the nipple 6, the cross section $d$–$d$ of the nipple may be made angular, for example rectangular or polygonal, and the aperture in the disc 2 may have a corresponding configuration.

I claim:
1. A readily detachable safety hose coupling consisting of male and female parts, which permits the interconnection of only a predetermined male part with a predetermined female part according to the intended use of the coupling, comprising a nipple forming the male part adapted to be secured to the end of a hose, a coupling member forming the female part and having a cavity adapted to removably receive said nipple, and an annular member placed coaxially of said nipple and rotatably held in place within said coupling member, the outside diameter of said nipple being slightly smaller than the inside diameter of said annular member to enable axial insertion and removal of said nipple through said annular member, said annular member being provided with internal protuberances spaced at predetermined angular locations in conformity with the intended use, and the outside of said nipple being provided with correspondingly placed and shaped substantially axial grooves individually receiving said protuberances of said annular member upon insertion of said nipple into said coupling member and extension of said nipple through said rotatable annular member, the angular arrangement of mutually corresponding protuberances and axial grooves differing for different uses of the coupling to prevent accidental use of one coupling part of a coupling intended for one use only with the coupling part of a coupling intended for another use only by enabling insertion of only a predetermined nipple into a corresponding coupling member through said annular member whereby the danger of shearing off the protuberances of said annular member upon application of torque to the nipple is eliminated by the ability on the part of said annular member to rotate within said coupling member.

2. A readily detachable safety hose coupling consisting of male and female parts which permits the interconnection of only a predetermined male part with a predetermined female part according to the intended use of the coupling, comprising a nipple forming the male part and adapted to be secured to the end of a hose, a coupling member forming the female part and having a cavity adapted to removably receive at least a part of said nipple, and a circular disc member placed coaxially of and permanently rotatably held in place within said coupling member, said disc member having an aperture including radial portions set at a predetermined angle, the part of said nipple received in said cavity having axial outer surface portions complementary to and set at the same angle on the circumference of said nipple as said radial portions of said disc member whereby the cross sectional configuration of said nipple corresponds to the configuration of said aperture, affording extension of said nipple through said disk member in both axial directions while permitting relative rotation of the connected nipple and coupling member, the angular arrangement of mutually corresponding radial portions and axial surface portions differing for different uses of the coupling to prevent inadvertent accidental use of one coupling part of a coupling intended for one use only with the coupling part of a coupling intended for another use only by enabling insertion of only a predetermined nipple into a corresponding coupling member, whereby the danger of shearing off the radial portions upon application of torque to the nipple is eliminated by the ability of said disk member to rotate within said coupling member.

3. A hose connection as defined in claim 2 wherein said coupling member has an annular recess coaxially rotatably receiving said disc member and axially abuttingly cooperating with said disc member.

4. A hose connection according to claim 3 wherein said annular recess is at the end of said coupling member through which said nipple is inserted into said coupling member, a bead being provided at the end of said coupling member through which end said nipple is inserted, said bead abutting against said disc member in said recess.

5. A hose connection as defined in claim 1, further comprising means in said coupling member normally holding said annular member in place and normally restraining rotation of said annular member and effective to allow rotation of said annular member together with said nipple upon application of a predetermined turning force effectively acting upon said annular member.

6. A readily detachable safety hose coupling consisting of male and female parts which permits the interconnection of only a predetermined male part with a predetermined female part according to the intended use of the coupling, comprising a nipple forming the male part and adapted to be secured to the end of a hose, a coupling member forming the female part and having a cavity adapted to receive at least a part of said nipple, and a circular disk member placed coaxially of said nipple and rotatably secured in said coupling member, said disk member being provided with an aperture of a configuration permitting insertion of only a predetermined nipple into said disk member and said coupling member, the cross sectional configuration of said nipple, which corresponds to the configuration of said aperture but is slightly smaller in the external dimensions thereof to enable axial insertion and removal of said nipple through said disk member, being predetermined to permit extension of said nipple through said disk member only if the nipple belongs to a hose intended for the same use as the coupling member into which the nipple is to be inserted, said configurations of said aperture and of said nipple providing a non-rotatable engagement between said disk member and said nipple and the predetermined cross sectional configuration of the nipple being provided over a substantial portion of the axial length of the nipple and located at such place as to provide engagement with the corresponding configuration of the disk member upon insertion of said nipple into said cavity by a substantial distance.

7. A hose connection as defined in claim 6, further comprising means engaging said disk member to normally restrain rotation of said disk member and effective to allow rotation of said disk member and therewith of said nipple with respect to said coupling member upon application of a predetermined excess turning force.

8. A readily detachable safety hose coupling consisting of male and female parts, which permits the interconnection of only a predetermined male part with a predetermined female part according to the intended use of the coupling, comprising a nipple forming the male part, a coupling member forming the female part and having a cavity adapted to receive a portion of said nipple, and an annular disk member placed coaxially of said nipple and rotatably held in said coupling member, means in said coupling member for securely holding said annular disk member in place in the axial direction thereof while enabling rotatable movement of said annular disk member upon application of a predetermined torque, the outside configuration of said nipple corresponding to but being slightly smaller than the inside configuration of said annular disk member to enable axial extension and withdrawal of said nipple through said annular member, the contours of said annular member and of said nipple being provided with complementary protuberances and grooves, the angular arrangement of mutually corresponding protuberances and axial grooves differing for different uses of the coupling to prevent accidental use of one coupling part of a coupling intended for one use only with the coupling part of a coupling intended for another use only by enabling insertion of only a predetermined nipple into a corresponding coupling, whereby the danger of shearing off the protuberances upon application of torque to the nipple is eliminated by said means affording to said disk member the ability to rotate, and the grooves in said nipple being provided within an area located a substantial distance from the free end thereof which is inserted into said cavity.

References Cited in the file of this patent
UNITED STATES PATENTS

| | | |
|---|---|---|
| 244,804 | Gillespie | July 26, 1881 |
| 738,503 | Waters | Sept. 8, 1903 |
| 770,525 | Hussey | Sept. 20, 1904 |
| 1,031,587 | Reisik | July 2, 1912 |
| 1,531,563 | McDowell | Mar. 31, 1925 |
| 1,842,897 | Culp | Jan. 26, 1932 |